May 26, 1925.
J. R. BARTHOLOMEW
BRAKE DRUM LINING
Filed April 13, 1923
1,538,918
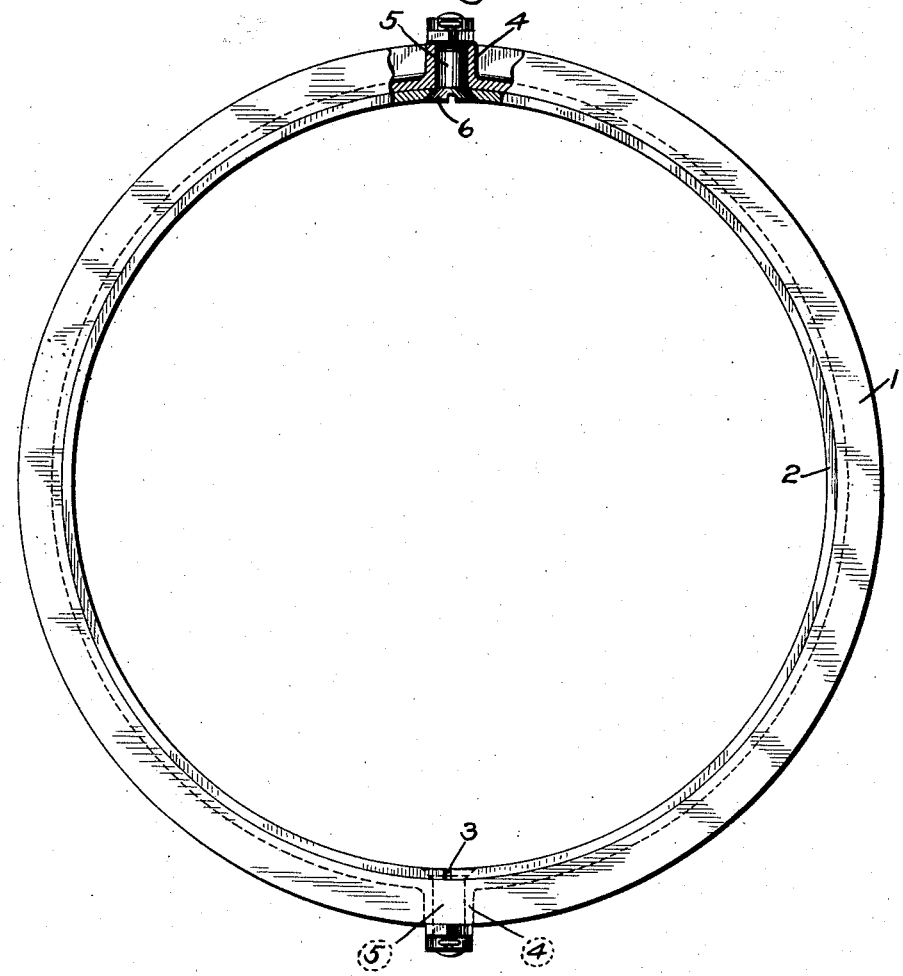
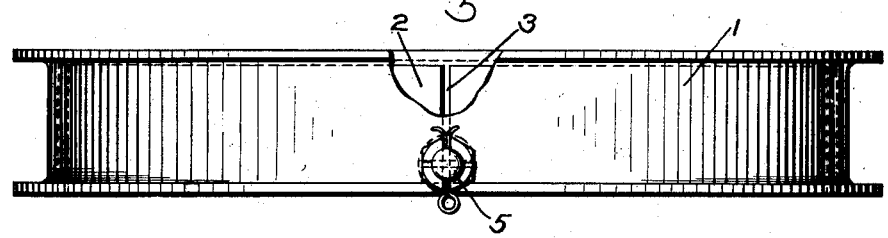
INVENTOR
JOHN R. BARTHOLOMEW
BY *Wm. M. Cady*
ATTORNEY Patented May 26, 1925.

1,538,918

UNITED STATES PATENT OFFICE.

JOHN R. BARTHOLOMEW, OF BERKELEY, CALIFORNIA, ASSIGNOR TO THE WESTINGHOUSE AIR BRAKE COMPANY, OF WILMERDING, PENNSYLVANIA, A CORPORATION OF PENNSYLVANIA.

BRAKE-DRUM LINING.

Application filed April 13, 1923. Serial No. 631,839.

*To all whom it may concern:*

Be it known that I, JOHN R. BARTHOLOMEW, a citizen of the United States, residing at Berkeley, in the county of Alameda and State of California, have invented new and useful Improvements in Brake-Drum Linings, of which the following is a specification.

This invention relates to brakes of the automotive type in which expansible brake shoes are adapted to frictionally engage the interior friction face of a brake drum.

It has heretofore been proposed to provide a removable lining for the brake drum, against which the brake shoes are adapted to engage, so that the lining will take the wear and after the same has become sufficiently worn, the worn lining may be removed and a new lining replaced.

The principal object of my invention is to provide an improved removable brake drum wear lining.

In the accompanying drawing; Fig. 1 is an elevation of a brake drum with my improved brake lining applied thereto; and Fig. 2 a plan thereof.

A brake drum 1 is shown in the drawing and according to my invention the brake drum lining 2 is made in one piece, with a single joint at the point 3. In order to secure the lining 2 in place, the drum 1 is provided at diametrically opposite points with apertured bosses 4 for receiving securing bolts 5. The bolts 5 are provided with conical heads 6 adapted to engage cone shaped recesses in the brake lining 2, one recess preferably straddling the open joint 3, so that when the bolt 5 is screwed home, the meeting ends of the brake lining will be clamped firmly in position.

The conical heads 6 of the bolts 5 ensure that the lining 2 will continue to be held in place as the lining wears down and when a worn lining is to be replaced by a new one, it is merely necessary to remove the bolts 5, when the lining 2 may be slipped out by a lateral movement thereof without dismantling or otherwise disturbing the brake mechanism for that purpose.

Having now described my invention, what I claim as new and desire to secure by Letters Patent, is:—

The combination with a brake drum, of a split one-piece brake lining mounted in said drum and having a cone-shaped recess straddling the joint in the lining and a bolt having a cone-shaped head engaging said recess for securing said lining to the drum.

In testimony whereof I have hereunto set my hand.

JOHN R. BARTHOLOMEW.